United States Patent Office 2,881,114
Patented Apr. 7, 1959

2,881,114

PROCESS FOR THE REMOVAL OF PYROGENS FROM THERAPEUTICALLY ACTIVE PREPARATIONS WITH INSOLUBLE PHOSPHATE SALTS

Jan Daniël Herman Homan, Oss, Netherlands, assignor to Organon Inc., Orange, N.J., a corporation of New Jersey No Drawing. Application April 8, 1957
Serial No. 651,136

Claims priority, application Netherlands April 25, 1956

6 Claims. (Cl. 167—58)

The invention relates to a process for the removal of pyrogens from biologically active materials.

Pyrogens are metabolic products of bacteria which, on intravenous injection, sometimes even in the presence of only spores, cause a rise of the patient's temperature. Many therapeutic products which are obtained from natural materal contain such pyrogens as undesired contaminants.

Thus pyrogens are e.g. present in heparin which is prepared from cattle lungs, in choriogonadotropin which is prepared from urine of pregnant women, in hyaluronidase which is obtained from bacteria cultures and which, e.g. on hypodermic injection, promotes resorption of some agents by the body tissues, in streptokinase-streptodornase which mixture of substances is produced by streptococci and of which the former substance dissolves blood coagula and the latter substance may affect the cell walls of bacteria, and in serum gonadotropin which is prepared from serum of pregnant mares.

Although pyrogens especially occur in products which have been obtained from biological raw material, they may also occur in synthetic products in the preparation of which some or other reaction medium in which bacteria may develop has been infected from the air.

As in general any rise in temperature in a patient after an intravenous injection of therapeutic products is very undesirable, the removal of pyrogens, the chemical character of which is mostly unknown, is of great importance.

A process is known for rendering heparin preparations pyrogen-free, according to which process the preparation is made strongly alkaline, as a result of which the pyrogens are decomposed while the heparin is substantially unaffected. However, this method is not universally applicable, because most of the therapeutic products, especially the protein-like products, decompose in a strongly alkaline medium.

Heparin is also known to be rendered pyrogen-free by preparing a solution of it which has a concentration of at least 40%, bringing this solution at a pH=8.5 and subsequently leaving it to stand at 0–5° C. for 48 hours during which period a pyrogen-containing precipitate has formed which can be centrifuged off.

This method, too, is not universally applicable, because of most of the therapeutic products such a strong solution cannot be formed, irrespective of the question whether the pyrogens can be precipitated from concentrated solutions of these products.

According to the invention pyrogens can be removed from biologically active preparation by bringing an insoluble phosphate into a solution of it and separating it again after some time. Then, if desired, the solid biologically active preparation can be isolated from the solution, but in many cases the solution may be applied directly as injection liquid.

Surprisingly it has appeared that in the process according to the invention the pyrogens are removed selectively, for the losses of active substance are very slight, even when repeating the process according to the invention a few itmes which is sometimes necessary if start is made from a strongly pyrogenic product.

The invention may be applied both for rendering biologically active preparations pyrogen-free, so e.g. the injection liquids themselves, and for the removal of pyrogens in an earlier stage in the recovery of the biologically active preparation or in the synthesis. In general when preparing a therapeutic product the treatment according to the invention will preferably be carried out in one of the last steps, because after this treatment the activities have to be carried out under sterile conditions, as on possible air-infection, pyrogens might form again.

Although the insoluble phosphate as such may be added to the solution to be treated, it is recommendable to have this formed in the solution in situ.

If the insoluble phosphate is allowed to form in the solution in situ, it is of advantage first to add a soluble phosphate to the solution and then an equivalent quantity or a slight excess of the ion which forms the insoluble phosphate.

The phosphate may be added to aqueous solutions of the pyrogenic product but also e.g. to alcohol-containing solutions, dependent on the properties of the product to be purified. The pH is preferably chosen between about 8 and about 10.

Preferably use is made of phosphates of the earth alkali metals, particularly of calcium phosphate. Although the quantity of insoluble phosphate which is brought into the solution is not bound by critical limits, there is generally brought at least so much of it into the solution that it can well be centrifuged or filtered. In general no more than 0.25 milligram equivalent of insoluble phosphate per ml. of the solution to be treated is used and preferably no more than 0.15 milligram equivalent; often even no more than 0.025 milligram equivalent per ml. is necessary.

The following examples serve for purposes of illustration from which it appears that the invention is universally applicable for rendering highly diverging biologically active preparations pyrogen-free.

*Example I*

To 100 ml. of an aqueous solution of bacterial hyaluronidase which contained per ml. 50,000 V.R. units (viscosity reducing unit: see J. Madiaveitia and T. H. H. Quibell, Biochem. J. 34, 625 (1940)) a solution of 1.52 g. (4 mmol) of $Na_3PO_4$ 12 aq. in 10 ml. of water was added at 5° and subsequently while stirring and in one dash a solution of 1.25 g. (6.5 mmol) of calcium acetate 2 aq. in 5 ml. of water. Then the pH of the mixture was brought at 8.5 and the mixture was left to stand at 5° C. for 10 minutes. Then the precipitate was centrifuged off. The filtrate could both be used directly and be lyophilised.

The loss of hyaluronidase in a number of experiments amounted to at most 10%.

The pyrogenities of the starting product and the final product were determined by injecting rabbits intravenously with 50 V. R. U. per kg. of rabbit.

On application of the starting product the average temperature rise amounted to 0.9° C. On applying the product treated according to the invention the average rise in temperature amounted to only 0.2° C.

*Example II*

To 100 ml. of a solution of streptokinase-streptodornase which contained per ml. 20,000 S.U. (see L. R. Christensen, J. Clin. Invest. 28, 163 (1949).) streptokinase and 5,000 S.U. streptodornase a solution of 1.52 g. of $Na_3PO_4$ 12 aq. in 10 ml. of water was added at 0° C., after which the pH of the solution was brought at 9 with alkali. Subsequently a solution of 1.25 g. of calcium acetate 2 aq. in 5 ml. of water was added. The whole was left to stand for 15 minutes, after which the precipitate was centrifuged off. The filtrate could be used directly or be lyophilised. The loss of streptokinase amounted to at most 10% and the loss of streptodornase to at most 12%.

The pyrogenity was determined by injecting rabbits with 10,000 U streptokinase per kg. of rabbit.

The starting product caused an average rise in temperature of 1.2° C. and the product treated according to the invention a rise of only 0.3° C.

*Example III*

1 g. of heparin which contained per mg. 130 I.U. was dissolved in 150 ml. of water. In the resulting solution successively 500 mg. of kitchen salt and 316 mg. of tertiary sodium phosphate 12 aq. (2.5 milligram equivalent) were then dissolved. After cooling to 6° a solution of 3.3 milligram equivalent calcium chloride in 10 ml. of water was subsequently added while stirring, after which the pH of the mixture was brought at 10. After having been left to stand for some time the precipitate was centrifuged off.

From the filtrate the heparin was precipitated with acetone. In this way a product was obtained which contained 140 I.U. heparin per mg. The loss of heparin amounted to only a few percent.

The pyrogenity was determined by injecting rabbits with 1,000 I.U. per kg. of rabbit. The non-treated product caused an average rise in temperature of 2.2° C. and the product treated according to the invention a rise of only 0.3° C.

In the same way as described, but using strontiumchloride instead of calcium chloride 1 g. of heparin of the same batch as used above was rendered pyrogen free. In this case the treated product caused an average rise in temperature of 0.5° C.

*Example IV*

100 mg. of choriogonadotropin which contained per mg. 1,900 I.U. were dissolved in 40 ml. of 38% aqueous alcohol which contained 10% ammonium acetate. To the thus obtained solution a suspension of calcium phosphate which had been obtained by mixing 1.2 ml. of a 0.1 molar tert. sodium phosphate solution with 1.2 ml. of a 0.3 molar calcium chloride solution was added while stirring and at room temperature.

The pH of the mixture was subsequently brought at 8.7 after which the mixture was allowed to stand for 2 hours. Subsequently the precipitate was centrifuged off and the hormone was precipitated again from the filtrate by raising the alcohol content thereof. In this way a product was obtained which contained 2,300 I.U. choriogonadotropin per mg. The loss of choriogonadotropin amounted to only 2%.

The pyrogenity of the products prior to and after the treatment was determined by injecting rabbits with 500 I.U. per kg. of rabbit. The non-treated product caused an average rise in temperature of 1.5° C. and the product treated according to the invention a rise of 0.2° C.

100 mg. of choriogonadotropin of the same batch as used above was rendered pyrogen free in the same manner as described, using a suspension of bariumphosphate obtained by mixing the said sodium phosphate solution with bariumchloride. The temperature rise after injection in rabbits in the same quantities as above was averagely 0.4° C.

*Example V*

An aqueous solution of not entirely purified choriogonadotropin was diluted with alcohol until the alcohol content amounted to 50% after which 8% ammonium acetate was dissolved in it. To 20 ml. of the thus obtained solution, which according to assay contained totally 160,000 I.U. hormone, were successively added 0.8 ml. of 0.2 molar tert. sodium phosphate solution and 0.8 ml. of a 0.3 molar calcium acetate solution at 3° C. The pH of the mixture was subsequently brought at 8.5. After having been left to stand for 90 minutes the precipitate was centrifuged off. Because the starting product was strongly pyrogenic, the filtrate was once again treated in the same way as described above. After centrifuging off of the second calcium phosphate precipitate the hormone was precipitated from the filtrate by raising the alcohol concentration thereof. In this way a product was obtained which contained per mg. 2,000 I.U. choriogonadotropin. The loss of hormone amounted to only 3% totally.

The pyrogenity was determined in the same way as described in Example IV. The non-treated product caused a rise in temperature of on an average 2.5° C. and the product treated according to the invention resulted in a rise in temperature of on an average only 0.3° C.

The same results were obtained when using barium acetate instead of calcium acetate.

*Example VI*

500 mg. of serum gonadotropin which contained per mg. 300 I.U., were dissolved in 50 ml. of 5% ammonium acetate containing 38% aqueous alcohol. To the resulting solution were successively added at room temperature 1.3 ml. of a 0.2 molar tert. phosphate solution and 1.3 ml. of a 0.3 molar calcium acetate solution. Then the pH of the mixture was brought at 8.8. After the mixture had been allowed to stand for 1 hour the precipitate was centrifuged off. The hormone was precipitated from the filtrate by raising the alcohol content thereof. The resulting product contained 450 I.U. per mg.

The pyrogenity was determined by injecting rabbits with 500 I.U. serum gonadotropin per kg. of rabbit. The non-treated product caused a rise in temperature of 1.2° C. and the product treated according to the invention a rise of only 0.35° C.

I claim:

1. Process for the removal of pyrogens from an aqueous solution of injectable therapeutically active organic material, comprising adding an alkaline earth metal phosphate to said solution to adsorb substantially all the pyrogens while the major portion of the therapeutically active material remains in solution and removing said phosphate, onto which the pyrogens are adsorbed, from said solution.

2. Process for the removal of pyrogens from an aqueous solution of injectable therapeutically active organic material, comprising adding an alkaline earth metal phosphate to said solution to adsorb substantially all the pyrogens while the major portion of the therapeutically active material remains in solution, adjusting the pH of the solution to a value of from 8 to 10 and removing the said phosphate, onto which the pyrogens are adsorbed, from said solution.

3. Process for the removal of pyrogens from an aqueous solution of injectable therapeutically active organic material, comprising adding an alkaline earth metal phosphate to said solution in a quantity of from 0.025 to 0.15 milligram equivalents per ml of solution to be treated to adsorb substantially all the pyrogens while the major portion of the therapeutically active material remains in solution, and removing said phosphate, onto which the pyrogens are adsorbed, from said solution.

4. Process for the removal of pyrogens from an aqueous solution of injectable therapeutically active organic material, comprising adding phosphate ions and ions of an alkaline earth metal to said solution to form an alkaline earth phosphate therein to adsorb substantially all the pyrogens while the major portion of the therapeutically active material remains in solution, and removing the formed phosphate of the alkaline earth metal onto which the pyrogens are adsorbed from said solution.

5. Process for the removal of pyrogens from an aqueous solution of injectable therapeutically active organic material, comprising adding phosphate ions and calcium ions to said solution to form a calcium phosphate therein to adsorb substantially all the pyrogens while the major portion of the therapeutically active material remains in solution, and removing the formed calcium phosphate onto which the pyrogens are adsorbed from said solution.

6. Process for the removal of pyrogens from an aqueous solution of injectable therapeutically active organic material, comprising adding phosphate ions and at least an equivalent quantity of calcium ions to said solution to form a calcium phosphate therein to adsorb substantially all the pyrogens while the major portion of the therapeutically active material remains in solution, and removing the formed calcium phosphate onto which the pyrogens are adsorbed from said solution.

References Cited in the file of this patent

Bister: Chem. Abst., vol. 48, 1954, p. 7181.

U.S. Dispensatory, 25th ed., 1955, pp. 230 and 231, Lippincott Co., Philadelphia, Pa.

Norlin: Acta Pathologia et Microbiologica Scand., vol. 24, 1947, pp. 506, 511 and 513.

Eaton: J. Bacteriology, 1936, pp. 347 and 348.

Parfentjev: J. Bacteriology, December 1945, pp. 661–666.

Mueller: J. of Bacteriology, vol. 67, No. 3, March 1954, pp. 271 and 274.